(12) United States Patent
Rubenic

(10) Patent No.: US 6,481,470 B1
(45) Date of Patent: Nov. 19, 2002

(54) AEROSOL CAN AND CONTENTS SALVAGE APPARATUS

(76) Inventor: John Rubenic, 426 Beloit, Forest Park, IL (US) 60130

( * ) Notice: Subject to any disclaimer, the term of this patent is extended or adjusted under 35 U.S.C. 154(b) by 0 days.

(21) Appl. No.: 10/190,364

(22) Filed: Jul. 3, 2002

(51) Int. Cl.7 .................................................. B65B 1/04
(52) U.S. Cl. .......................... 141/329; 141/65; 222/5; 222/835
(58) Field of Search .............................. 141/65, 67, 59, 141/329, 330, 286; 222/5, 80–85

(56) References Cited

U.S. PATENT DOCUMENTS

| | | | |
|---|---|---|---|
| 3,303,968 A | 2/1967 | Compere | 222/82 |
| 3,333,735 A | 8/1967 | Odasso | 222/5 |
| 3,438,548 A | 4/1969 | Ceyba | 222/80 |
| 4,349,054 A | 9/1982 | Chipman et al. | 141/1 |
| 5,086,814 A | 2/1992 | Sato et al. | 141/65 |
| 5,114,043 A | 5/1992 | Collins, Jr. | 222/86 |
| 5,271,437 A | 12/1993 | O'Brian et al. | 141/51 |
| 5,285,827 A | * 2/1994 | Gonzalez-Miller et al. | 100/102 |
| 5,309,956 A | 5/1994 | Hajma | 141/7 |
| 5,365,982 A | 11/1994 | O'Neill | 141/51 |
| 5,385,177 A | 1/1995 | O'Neill | 141/1 |
| 5,740,615 A | 4/1998 | Treske | 30/448 |
| 5,823,236 A | 10/1998 | Kirby et al. | 141/330 |
| 5,992,475 A | * 11/1999 | Campbell | 141/329 |

* cited by examiner

Primary Examiner—Steven O. Douglas
(74) Attorney, Agent, or Firm—Philip H. Kier

(57) ABSTRACT

Apparatus for puncturing an aerosol can's valve, draining its contents through the puncture, and for drawing any remaining contents from the can should there be insufficient pressure in the can for it to be fully evacuated when punctured. When the valve is replaced, the can is reusable. The puncturing apparatus has a stationary compartmented piercing tube and a housing that is free to move up and down relative to the piercing tube. The housing is spring-loaded to offer resistance to movement so that a seal is achieved between the housing and the can before the piercing tube makes contact with the can, and to return the housing to its rest position after each piercing cycle. An air cylinder is used to apply pressure to the bottom of the aerosol can so that it will move downward to engage the piercing tube and release its contents into a first compartment. A drawing cylinder contains a piston and uses vacuum means to draw contents from the aerosol can and mechanical mean to transfer such content from the apparatus through a discharge port.

4 Claims, 4 Drawing Sheets

AEROSOL CAN AND CONTENTS SALVAGE APPARATUS

BACKGROUND OF THE INVENTION

The present invention is an apparatus for puncturing aerosol cans. More specifically it is an apparatus for puncturing aerosol cans and salvaging their content such that the cans' contents can be disposed of in an environmentally safe manner and the cans can be reused when new valves are installed.

It has been recognized for a number of years that the contents of an aerosol can should be emptied from the can and disposed of in an environmental safe manner. There have been a number of patents with apparatus for doing so. For example, Hajms in U.S. Pat. No. 5,309,956, O'Neill in U.S. Pat. No. 5,395,982, Odasso in U.S. Pat. No. 3,333,735, and O'Brien, et al in U.S. Pat. No. 5,271,437 teach puncturing the bottom wall of the aerosol can. Others, such as Sato, et al in U.S. Pat. No. 5,086,814, Chipman, et al in U.S. Pat. No. 4,349,054, and Ceyba in U.S. Pat. No. 3,438,548 teach puncturing the lateral wall of the can. When either the lateral wall or the bottom wall of an aerosol can is pierced, the can cannot be reused but must be disposed of In year 2001, the cost of disposing of aerosol cans in bulk was approximately one dollar per can based on the cost of correctly disposing of a 55-gallon drum, which contains approximately 200 scrap aerosol cans.

In the present invention, the contents of a used aerosol can are removed through piercing the valve in the top surface of the can. With installation of a new valve, the can is suitable for reuse. In addition to the material conservation of the can, it is much less costly to install a new valve (approximately 6–8 cents per can) than to dispose of pierced aerosol cans in an acceptable way.

SUMMARY OF THE INVENTION

The invention has two main components:apparatus for puncturing an aerosol can and draining its contents through the puncture and apparatus for drawing any remaining contents from the can should there be insufficient pressure in the can for it to be fully evacuated when punctured. The puncturing apparatus has a stationary compartmented piercing tube and a housing that is free to move up and down relative to the piercing tube, assuming a vertical piercing tube. The housing is spring-loaded to offer resistance to movement so that a seal is achieved between the housing and the can before the piercing tube makes contact with the can, and to return the housing to its rest position after each piercing cycle. An air cylinder is used to apply pressure to the bottom of the aerosol can so that it will move downward to engage the piercing tube and release its contents into a first compartment. The piercing tube has ports in its lateral wall near the floor of the first compartment and the ceiling of a second compartment. This allows the contents of the aerosol to flow from the first compartment through a bypass chamber into the second compartment.

The second compartment of the piercing tube enters a cylinder, referred to as the drawing cylinder. The drawing cylinder contains a piston that divides it into two chambers, an upper chamber and a lower chamber. A piston rod is attached to a second air cylinder that is synchronized with the air cylinder that applies pressure to the aerosol can through a system of valves. Simultaneously with or slightly after starting to drain the contents of the aerosol, the second air cylinder causes the piston rod and piston to move downward to draw the contents of the aerosol can into the upper chamber through a vacuum effort. Then the direction of the piston is reversed and contents of the aerosol can are discharged from the upper chamber of the drawing cylinder through a port and check valve. The drawing cylinder and association synchronization apparatus are not needed if the aerosol can contains enough propellant to evacuate the aerosol can when pierced. Then, only the piercing apparatus is needed. However, to use the piercing apparatus without the drawing apparatus there is an additional step of pressure testing the aerosol can to ensure it contains sufficient propellant for the piercing apparatus to cause its complete evacuation.

BRIEF DESCRIPTION OF THE SEVERAL VIEWS

DETAILED DESCRIPTION OF THE INVENTION

Figure 1:
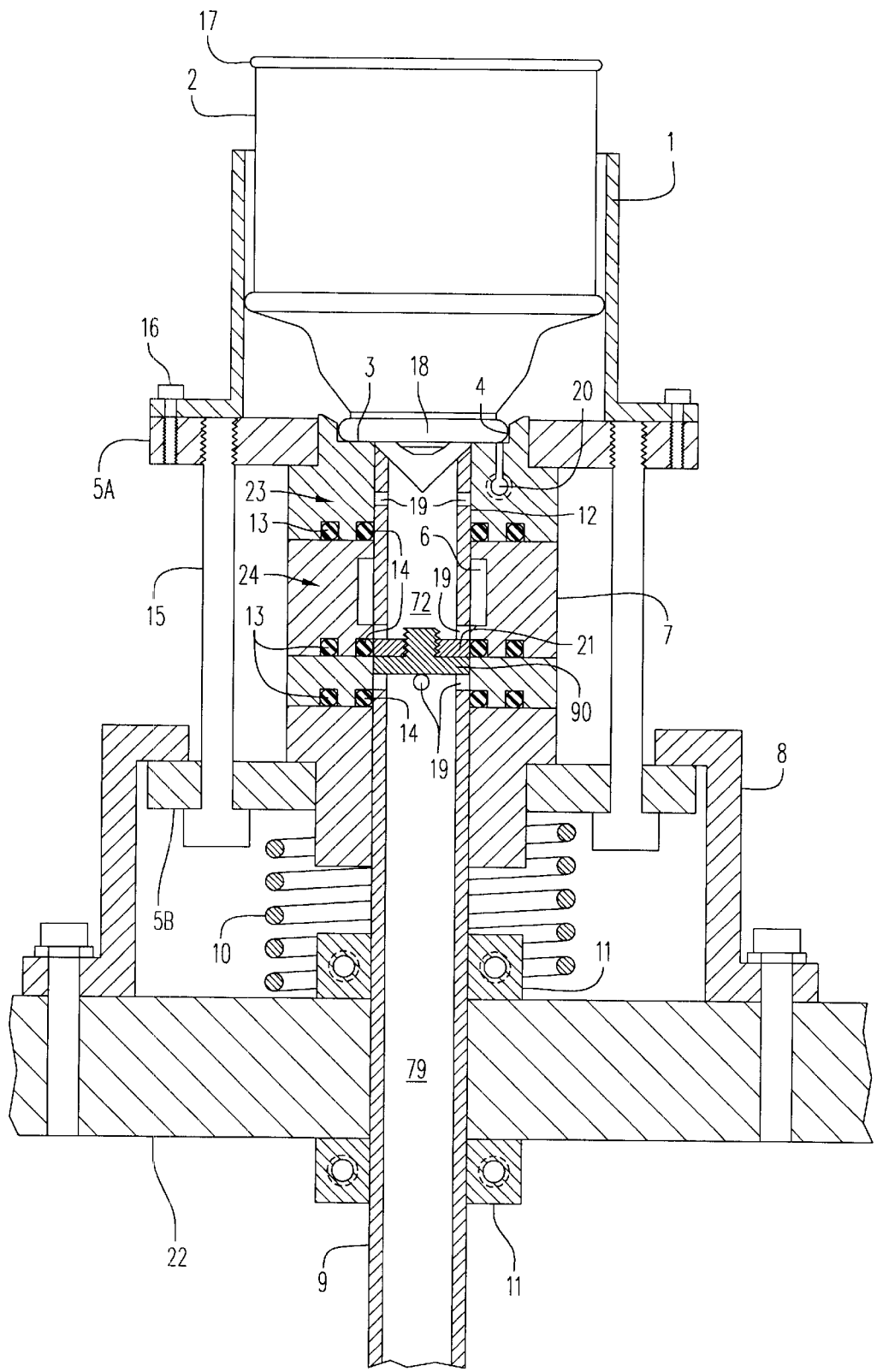
FIG. 1 is a cross sectional elevation of an aerosol can in the piercing apparatus positioned as before the piercing tube pierces the valve.
Figure 2:
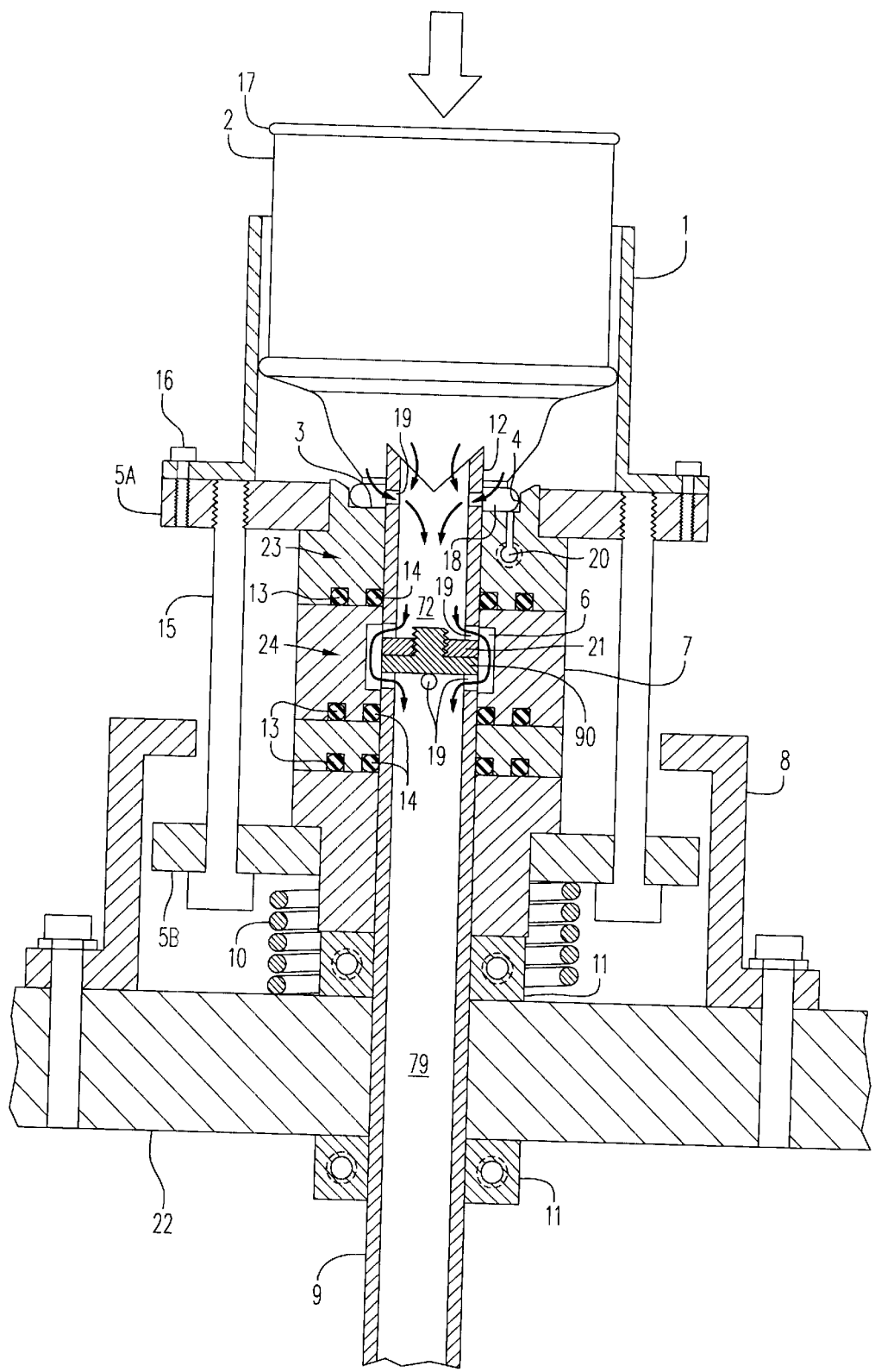
FIG. 2 is a cross sectional elevation of aerosol can in the piercing apparatus positioned as when the piercing tube pierces the valve.

A full or partially full aerosol can 2 is placed in a cylindrical can guide 1. The can guide is attached to a movable housing/adaptor 7 that moves relative to stationary piercing tube that has an upper section 12 and a lower section 9 separated by a diverter plate 21. The top of the upper section is beveled to have a sharp edge to pierce the aerosol can. The piercing tube is made of two sections so that to the upper section can be replaced readily when its beveled edge becomes dull from repeated piercing. This replacement can be facilitated by having a threaded hole in the center of diverter plate 21 into which the uppermost part 90 of the lower section of the piercing tube is threaded. The diverter plate separates the space within the piercing tube into an upper compartment 72 and a lower compartment 79. The walls of upper section 12 and lower section 9 have ports 19 near diverter plate 21. Pressure can be applied to the bottom 17 of the can by a mechanical device such as a hand lever or a pneumatic cylinder. This causes the can guide and housing/adaptor to move downward. This motion is resisted by return spring 10 that is being compressed. The housing/adaptor contains a bypass chamber 6. When an aerosol can is placed in the can guide 1 the return spring is in its rest position, as shown in FIG. 1, the bypass chamber is not aligned with ports 19. Rather the holes are aligned with the solid inner wall of the housing/adaptor. When the can guide 1 and housing/adaptor reach their position of lowest descent as shown in FIG. 2, ports 19 are aligned with the bypass chamber. When the housing/adaptor is slightly above its point of lowest descent, the upper section 12 pierces the valve 18 of the aerosol can. With this configuration, the contents of the aerosol can flow into the upper compartment 72, then flow outs of the upper compartment through ports 19 in the upper section of the piercing tube into bypass chamber 6 and then flow out of the bypass chamber through the ports in the lower section of the piercing tube 9 into lower compartment 79.

Figure 3:
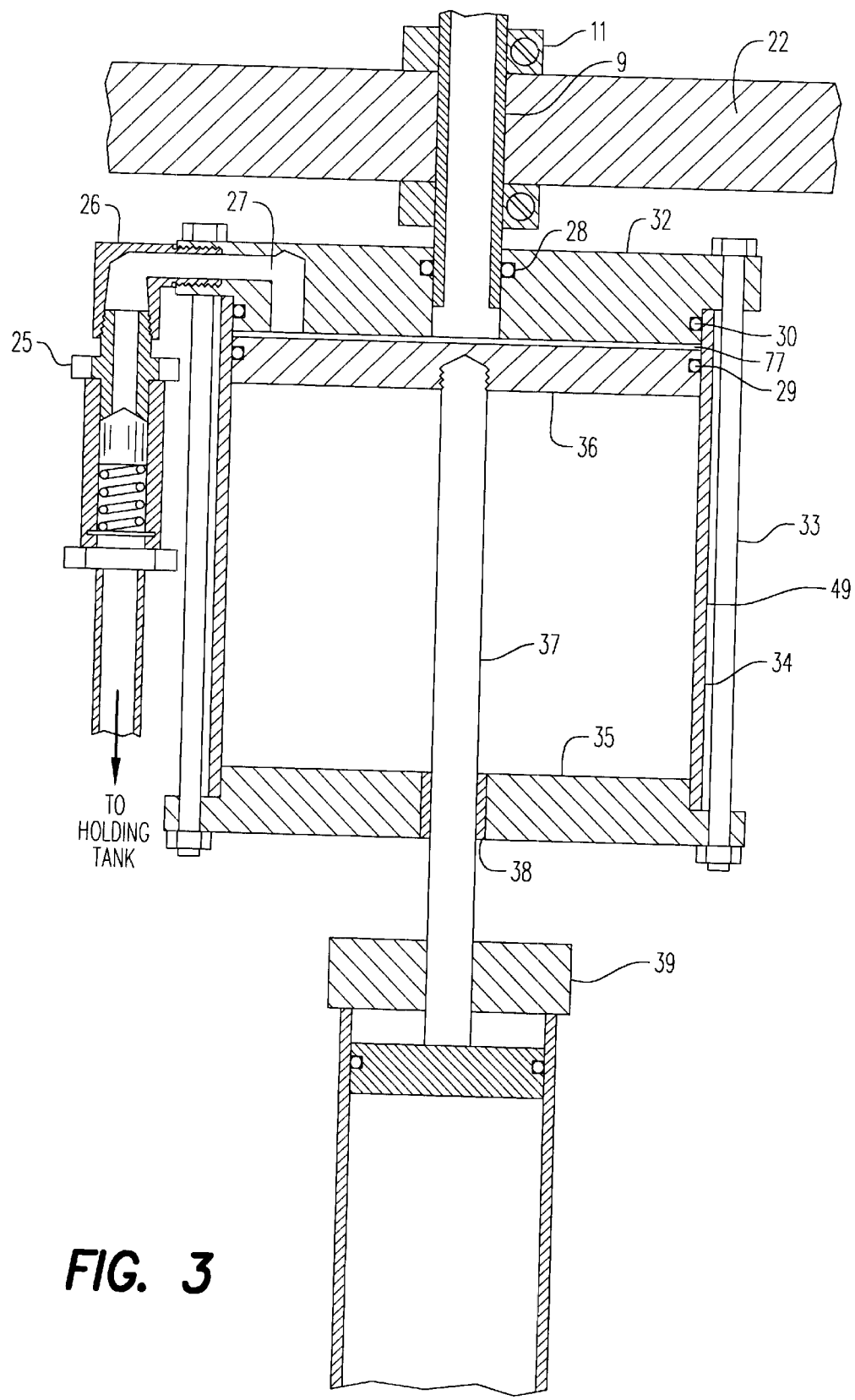
FIG. 3 is a cross sectional elevation of the drawing cylinder.

If the aerosol can is not pressurized or is under insufficient pressure, gravity might not be sufficient to cause sufficiently rapid evacuation of the aerosol can. Therefore, an embodiment of the invention also contains vacuum means to draw out the contents of the aerosol can. These means are a cylinder 49, referred to as the drawing cylinder, containing a piston 36 and a piston rod 37 shown in FIGS. 3 and 4. The drawing cylinder has an upper head 32, a lower head 35, and a lateral barrel 34. The drawing cylinder can be held together by tie bolts 33 and kept sealed by seals 29, between the upper head and the barrel, and 30, between the piston and the barrel. The upper head contains a central hole to which the lower section of the piercing rod 9 is attached, for example by means of seal 28. The upper head also contains a discharge port 27 leading to a check valve 25 through a street ell 26. Movement of piston rod is actuated by mechanical means such as a lever or pneumatic cylinder. In the embodiment shown in FIG. 3, it is actuated by pneumatic cylinder 39, and the lower head contains bushing 38 to allow piston rod 37 to extend beyond the lower head 35 to the pneumatic cylinder 39. The motion of the piston rod is synchronized with the motion of the can guide and housing/adaptor. When the upper section of the piercing tube 12 pierces the aerosol can's valve 18, the piston rod is lowered by the pneumatic cylinder to create a vacuum in the space between the upper head of the drawing cylinder 32 and piston 36, (the drawing cylinder upper chamber 77). This vacuum acts to drawing the contents of the aerosol can through the upper compartment 72, bypass chamber 6, lower compartment 79 into the drawing cylinder's upper chamber. At the completion of the piston's downward stroke, the air cylinder causes the piston to reverse direction in phase with the can guide reversing direction. This causes the piston to expel the contents of the aerosol can from the drawing cylinder's upper chamber 77 through discharge port 27 and check valve 25 to a holding tank, which is not shown in the figures.

Figure 4:
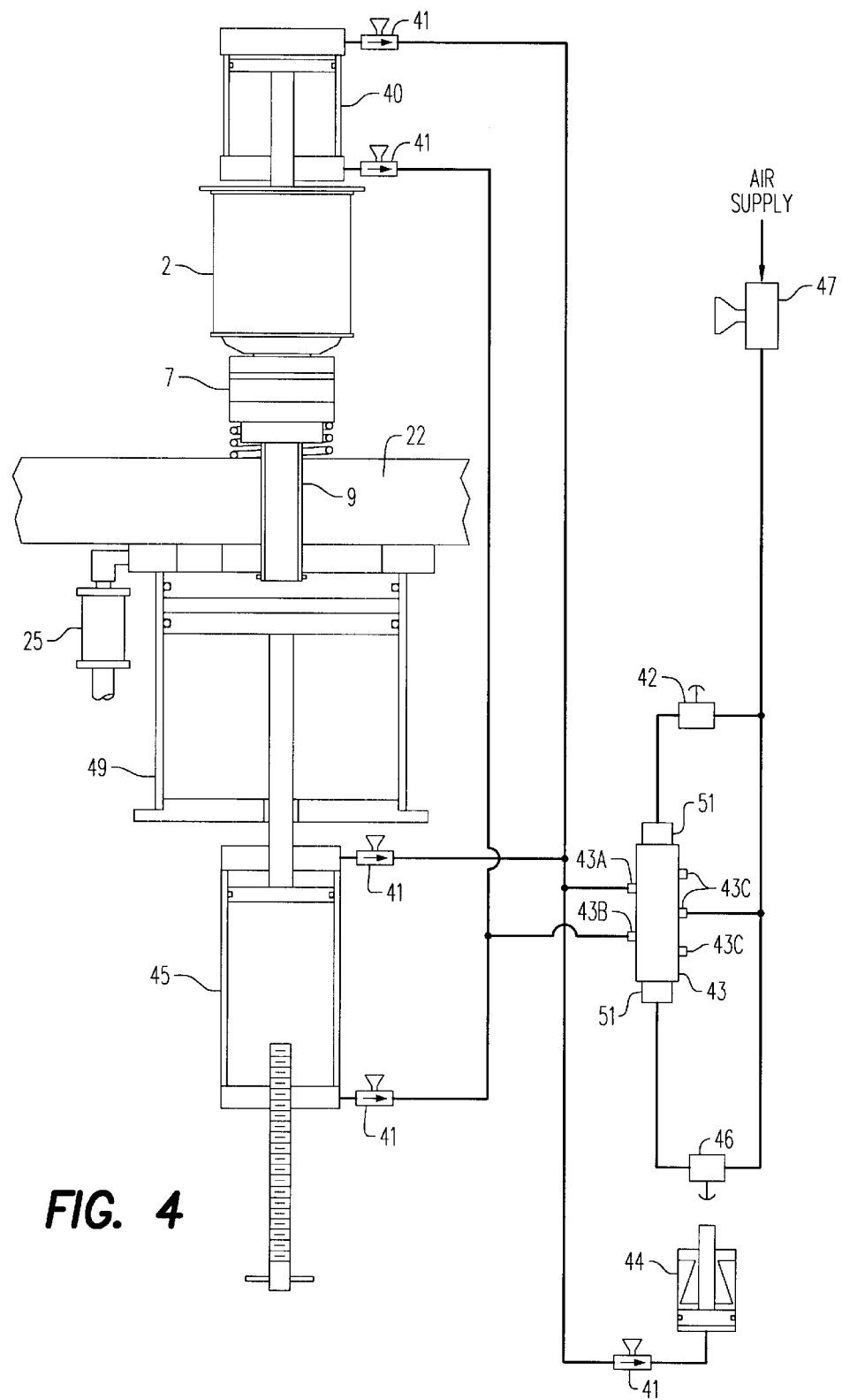
FIG. 4 is a schematic of the pneumatic circuit associated with the use of pneumatic cylinders.

A pneumatic circuit is shown in FIG. 4 that can operate the pneumatic cylinder that applies pressure to the bottom 17 of the aerosol can, the piercing cylinder 40 and the pneumatic cylinder that actuates piston rod 37, an adjustable stroke pneumatic cylinder 39. It is conventional and comprised of off-the-shelf components. A supply of compressed air is attached to an air pressure regulator 47. The air pressure regulator feeds regulated air valves 42, 43, and 46. Valves 42 and 46 are "three-way spring return momentary" valves. Valve 43 is a four-way spool valve, directed in both directions by two pilots 51. Depressing the poppet on valve 42 starts the cycle by shifting the spool in valve 43 by way of pilot 51 and allowing compressed air to flow through port A of valve 43. Port A is connected to piercing cylinder 40, adjustable stroke pneumatic cylinder 39, and time delay air cylinder 44. With compressed air flowing through port 43A, the piston rod in the piercing cylinder moves downward to apply pressure to the bottom of the aerosol can and cause the can guide 1 and housing/adaptor 7 to move downward. Open port 43A also causes the piston rod in the adjustable stroke pneumatic cylinder to cause the piston rod in the drawing cylinder to move downward to draw the content of the aerosol can into the draw cylinder upper chamber 77. Also, the time delay cylinder 44 is advancing toward the poppet on valve 46. When the piston rod on the time delay cylinder depresses the poppet on valve 46, the spool in valve 43 is shifted back to its rest position via pilot 51. This allows compressed air to pass through 43B of valve 43, which causes the pistons in the piercing cylinder 40 and the adjustable stroke pneumatic cylinder to reverse their motion. Time delay cylinder 44 is a spring return cylinder so that it will return to rest when the air that entered valve 43 through port 43C is exhausted. Valves 41 are adjustable orifice valves that control the flow of air to and from the piercing cylinder and the adjustable stroke pneumatic cylinder in the pneumatic circuit. Being adjustable orifice valves they can control precisely the speed of piston movement. When all cylinders have returned to rest position, the emptied aerosol can is removed. To initiate another cycle, more compressed air enters the pneumatic circuit through air pressure regulator 47. This pneumatic circuit is conventional.

The pneumatic circuit described above is well suited for speedy evacuation of aerosol can. However, other mechanical means, such as synchronized levers could be used to effect vertical movement of the piston rod 37 in the drawing cylinder 49 and vertical movement of the can guide 1. For an embodiment used when the aerosol can has sufficient pressure for sufficiently rapid evacuation, the drawing cylinder and synchronization circuitry is not needed. Contents of an aerosol can would leave the lower compartment to be directed to the holding tank.

The embodiment shown in the figures assumes that piercing apparatus is attached to the top of a table 22, or other horizontal surface, that the lower section of the piercing tube 9 extends through the table, and that the drawing cylinder sits below the table. FIGS. 1 and 2 show components of the housing/adaptor for this embodiment. Can guide 2 has a flange that is attached by means of cap screws 16 to an upper clamping bracket 5A. The upper clamping bracket and a lower clamping bracket 5B use bolts 15 to clamp the housing/adaptor 7. The housing/adaptor is annular in cross section and could be made of four sections. Its upper section 23 is made of a low-density polyethylene, a soft plastic material. Its top has a lip 4 and a recess 3. The upper section 23 could also contain a female thread 20 with an intersection hole of small diameter to lead to the top of the aerosol can to allow a tube fitting to be attached for admission of inert gas, if needed for safety. The upper middle section 24 of the housing/adaptor immediately below the upper section contains a bypass chamber 6. The bottom of the housing/adaptor communicates with return spring 10. The upper section of the housing/adaptor being soft plastic and being under compressive forces when the can guide is below its rest position, a primary seal is created between the aerosol can and the recess 3 in the top of housing/adapter 7 and a secondary seal is created between the lip 4 and the aerosol can.

When the can guide is in its rest position, the upper part of Z-shaped retaining bracket 8 is flush against the lower clamping bracket 5B. The lower part of Z-shaped retaining bracket 8 is attached to a table or stand 22. When pressure is applied to the bottom of the can and works against the return spring 10, the aerosol can, can guide, clamping brackets, and housing/adaptor move downward until the bottom of the housing/adaptor reaches a shaft collar 11 and movement is stopped by the shaft collar as shown in FIG. 2. Just before the housing adaptor reaches the shaft collar, the top of the upper part 12 of the piercing tube, pierces the metal aerosol valve 18. To ensure that the contents of the aerosol can flow into bypass chamber 6 and do not leak into any space between the piercing tube and the housing/adaptor, and hence the atmosphere, there are "O" ring seals 14 and redundant "O" seals 13 to seal together the housing/adaptor and the piercing tube. In the configuration shown in drawings there are three sets of "O" ring seals and redundant "O" seals. With three sets of seals, the housing/adaptor could be made in four sections to ease their maintenance.

The primary object of the instant invention is to evacuate an aerosol can through piercing its valve so that it can be reused. After a can is evacuated, it could be placed upright into a locating device on a drill press or similar machine so that it is centered under an aerosol valve removal device. This removal device could consist of a spring-loaded centering bell housing and a hole saw. The hole saw revolves while the center bell is fixed in relation to the container. At the centering bell is moved downward, it contacts the aerosol can and during the downward movement, a pneumatic control valve is cammed open to release an inert gas into a cavity above the can value so as to drive off any oxygen and prevent ignition of any residual flammable material in the can. Continued downward movement allows the hole saw to contact and cut through the aerosol valve crimped to the can to leave only a shard of metal clinging to the can opening. This shard can easily be lifted off and discarded. Releasing the can, inverting it and shaking it, will dislodge any part of the valve remaining inside the can. The aerosol container can now be rinsed and reused.

I claim:

1. An apparatus for evacuating the contents of an aerosol can with a valve, comprising:

a stationary piercing tube, the piercing tube being divided into two sections, an upper section and a lower section, by a diverter plate, ports in the piercing tube in the vicinity of the diverter plate, and the upper section having a beveled upper edge;

a movable housing/adaptor having an interior bypass chamber allowing passage of contents of the aerosol can from inside the upper section of the piercing tube to the lower section of the piercing tube when the housing/adaptor is at its point of lowest descent;

a movable aerosol can guide attached to the housing/adaptor;

mechanical means to apply pressure to an aerosol can held upside down in the aerosol can guide; and a return spring that resists downward movement of the housing/adaptor.

2. An apparatus for evacuating the contents of an aerosol can as set forth in claim 1 further comprising a drawing cylinder with a upper head, a lower head, and a barrel, the upper head having a central passage, to which the lower section of the piercing tube is attached, and a discharge port;

a piston and piston rod in said drawing cylinder, the piston rod penetrating the lower head; and mechanical means for moving the piston rod in the drawing cylinder in synchronization with the mechanical means for applying pressure to the aerosol can.

3. An apparatus for evacuating the contents of an aerosol can as set forth in claim 2 further comprising means for reversing downward movement of the housing/adaptor after the beveled upper edge of the upper section of the piercing tube penetrates the aerosol can's valve and a check valve connected to the discharge port.

4. An apparatus for evacuating the contents of an aerosol can as set forth in claim 3 wherein the mechanical means for applying pressure to the aerosol can and the mechanical means for moving the piston rod are pneumatic cylinders whose movements are synchronized by valve circuitry.

* * * * *